United States Patent
Sakamoto

(10) Patent No.: US 11,344,802 B1
(45) Date of Patent: May 31, 2022

(54) GAME SYSTEM, PROGRAM AND INFORMATION PROCESSING METHOD

(71) Applicant: Akatsuki Inc., Tokyo (JP)

(72) Inventor: Tomohiro Sakamoto, Tokyo (JP)

(73) Assignee: AKATSUKI INC., Tokyo (JP)

(*) Notice: Subject to any disclaimer, the term of this patent is extended or adjusted under 35 U.S.C. 154(b) by 0 days.

(21) Appl. No.: 17/475,054

(22) Filed: Sep. 14, 2021

(30) Foreign Application Priority Data

Feb. 15, 2021 (JP) .............................. JP2021-021472

(51) Int. Cl.
*A63F 13/25* (2014.01)
*A63F 13/426* (2014.01)
*A63F 13/92* (2014.01)
*A63F 13/833* (2014.01)
*A63F 13/58* (2014.01)

(52) U.S. Cl.
CPC .......... *A63F 13/426* (2014.09); *A63F 13/58* (2014.09); *A63F 13/833* (2014.09); *A63F 13/92* (2014.09)

(58) Field of Classification Search
CPC .......... A63F 13/20; A63F 13/22; A63F 13/23; A63F 13/25; A63F 13/30; A63F 13/32; A63F 13/327; A63F 13/33; A63F 13/332; A63F 13/335; A63F 13/35; A63F 13/40; A63F 13/426; A63F 13/45; A63F 13/50; A63F 13/52; A63F 13/5258; A63F 13/533; A63F 13/537; A63F 2300/30; A63F 2300/303; A63F 2300/305; A63F 2300/306; A63F 2300/51; A63F 13/58; A63F 13/70
See application file for complete search history.

(56) References Cited

U.S. PATENT DOCUMENTS

2012/0064969 A1* 3/2012 Uchibori .............. A63F 13/335
 463/29
2014/0329602 A1* 11/2014 Hisaoka .............. A63F 13/822
 463/42

FOREIGN PATENT DOCUMENTS

| JP | 2018047004 A | 3/2018 |
| JP | 2018094431 A | 6/2018 |
| JP | 2018102663 A | 7/2018 |
| JP | 2019013465 A | 1/2019 |
| JP | 2020103732 A | 7/2020 |
| JP | 2020178972 A | 11/2020 |

OTHER PUBLICATIONS

Notification of Reasons for refusal dated Mar. 25, 2021 for related Japanese Patent Application No. 2021-021472.

* cited by examiner

*Primary Examiner* — Omkar A Deodhar

(57) ABSTRACT

A game system, a program and an information processing method that can easily perform operation. A game system that provides a game that can be executed on a user terminal capable of accessing a server via a network, the game system including: a database in which an operation of a player in the game that a user uses in the game via the user terminal is preset and operation information displayed as an icon on the user terminal is stored, and an operation control unit that makes the player execute the operation at the coordinate position based on the operation information while moving the player to the coordinate position based on the operation information, when the operation information stored in the database is selected by the user and arranged at an arbitrary coordinate position in the game.

13 Claims, 11 Drawing Sheets

GAME SYSTEM, PROGRAM AND INFORMATION PROCESSING METHOD

TECHNICAL FIELD

The present invention relates to a game system, a program and an information processing method, and more particularly, to a game system, a program and an information processing method, which provides games that can be executed on user terminals capable of accessing a server via a network.

BACKGROUND ART

In recent years, games that can be executed on user terminals such as smartphones or game terminals capable of accessing a server via a network have been provided. In this type of game, it is known that an operation is executed in a game according to a user's operation via a controller (see, e.g., Patent Literature 1).

As the controller for this type of game, for example, a game pad used by being connected to a user terminal, or an operation interface displayed on a display of the user terminal is known.

When the user operates a player used in a game with the game pad, operation is executed via a physical direction indicating key and a command input key arranged on the game pad. Meanwhile, when operating with the operation interface, the operation is executed via a virtual direction indicating key or the like arranged in the operation interface.

CITATION LIST

Patent Literature

Patent Literature 1: Japanese Unexamined Patent Publication No. 2020-103732

SUMMARY OF THE INVENTION

Technical Problem

When operating a player with a direction indicating key or a command input key arranged on the above game pad or operation interface, for example, depending on the characteristics of the game, such as the player's movement being agile or the player's movement being three-dimensional, there is a concern that it may be difficult to operate with the direction indicating key and the like.

The present invention has been designed in view of the above-mentioned circumstances, and a problem to be solved of the present invention is to provide a game system, a program and an information processing method, that can easily perform operation.

Technical Solution

The game system according to the present invention for achieving the above object is a game system that provides a game executable on a user terminal that can access a server via a network, the game system comprising: a database in which an operation of a player in the game that the user uses in the game via a user terminal is preset and operation information displayed as an icon on the user terminal is stored, and an operation control unit that makes the player execute the operation at the coordinate position based on the operation information while moving the player to the coordinate position based on the operation information, when the operation information stored in the database is selected by the user and arranged at an arbitrary coordinate position in the game.

This enables movement of a player to a desired coordinate position in the game and make the player execute an operation at that coordinate position, by a simple operation in which the user selects operation information and arranges the operation information at an arbitrary coordinate position in a game.

The operation information processed by this game system is displayed on the user terminal as a virtual card-shaped icon.

The operation control unit of the game system is characterized by making a player execute a continuous operation over a certain period of time, when operation information is arranged at an arbitrary coordinate position in a game according to preset conditions. Further, the continuous operation over a certain period of time may include movement of a player to a plurality of different coordinate positions.

Further, this game system is characterized by including a game management unit that processes attribute data related to player attributes based on the execution of operation of the player based on the operation information.

The game provided by the game system is characterized in that it is a fighting type game in which a player fights with another player.

Further, this game system is characterized by further including an operation information changing unit in which the user changes operation in an operation information based on the instruction for associating the operation information with another operation information or a game medium.

The program according to the present invention for achieving the above object is a program for executing a game on a user terminal capable of accessing a server via a network, characterized in that, when an operation of a player in the game that the user uses in the game via a user terminal is preset and operation information displayed as an icon on the user terminal is selected by the user and arranged at an arbitrary coordinate position in the game, an operation control unit makes a player execute the operation at the coordinate position based on the operation information while moving the player to the coordinate position based on the operation information.

The information processing method according to the present invention for achieving the above object is an information processing method for executing a game on a user terminal capable of accessing a server via a network, characterized in that, when an operation of a player in the game that the user uses in the game via a user terminal is preset and operation information displayed as an icon on the user terminal is selected by the user and arranged at an arbitrary coordinate position in the game, an operation control unit makes a player execute the operation at the coordinate position based on the operation information while moving the player to the coordinate position based on the operation information.

Advantageous Effects

According to the present invention, the user can easily operate a player in a game.

DETAILED DESCRIPTION OF THE EMBODIMENTS

Next, the game system according to the embodiment of the present invention will be described with reference to FIGS. 1 to 11.

Figure 1:
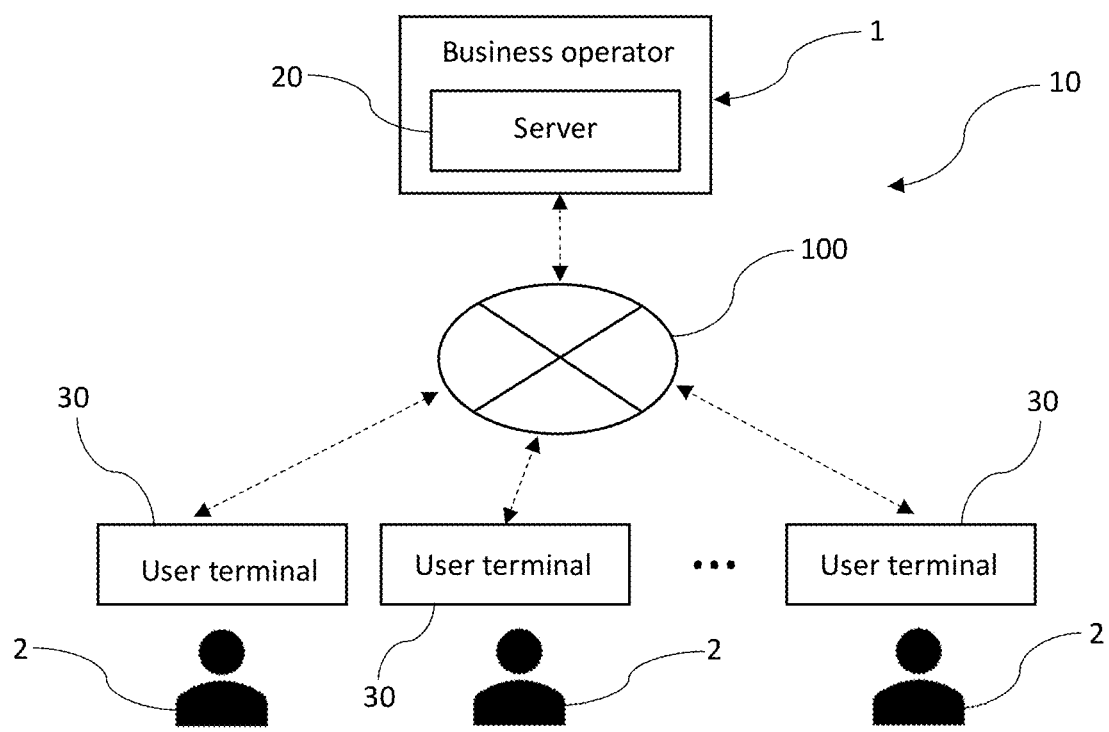
FIG. 1 is a block diagram illustrating an outline of a configuration of a game system according to an embodiment of the present invention.

FIG. 1 is a block diagram illustrating an outline of a configuration of the game system according to an embodiment of the present invention. As shown in the figure, the game system 10 includes a server 20 and a plurality of user terminals 30 as a main configuration, and these are connected to each other so as to be accessible via a network 100 such as the Internet network.

In the present embodiment, the server 20 is arranged in a business operator 1 that provides a game in the game system 10, and the user terminal 30 is owned by a plurality of users 2 who uses the game provided by the business operator 1.

The game provided by the business operator 1 in the game system 10 is a game in an arbitrary field, and for example, may be fighting games, puzzle games, action games, baseball games, soccer games, other sports games, quiz games, pinball games, card games, rhythm games, RPGs (role-playing games), location-based games, board games, adventure games, casino games, simulation games, strategy games, racing games, and the like.

Further, in the present embodiment, it is mainly assumed that the game provided by the business operator 1 is a fighting type action game in which the player used in the game fights with another player in real time.

Next, a specific configuration of each part of the game system 10 of the present embodiment will be described.

In the present embodiment, the server 20 is implemented by a desktop computer or a notebook computer.

Figure 2:
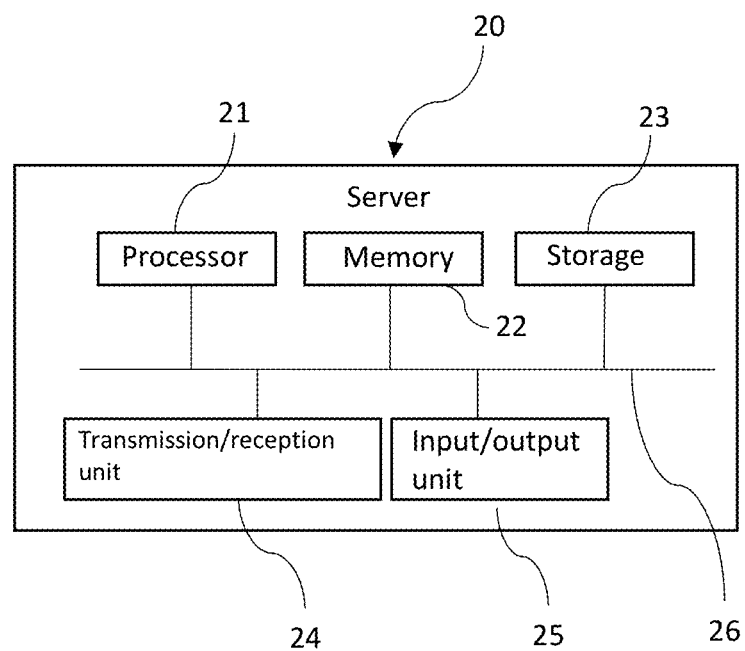
FIG. 2 is a block diagram illustrating an outline of a server configuration of a game system according to the present embodiment as well.

FIG. 2 is a block diagram illustrating an outline of a configuration of a server 20. As shown in the figure, the server 20 includes a processor 21, a memory 22, a storage 23, a transmission/reception unit 24, and an input/output unit 25, which are electrically connected to each other via a bus 26.

The processor 21 is an arithmetic device that controls the operation of the server 20, controls the transmission/reception of data between respective elements, and performs the processing necessary for executing an application program.

In the present embodiment, the processor 21 is, for example, a CPU (Central Processing Unit), and performs each processing by executing an application program stored in the storage 23 described later and deployed in the memory 22.

In the present embodiment, the memory 22 includes a main storage device configured of a volatile storage device such as a DRAM (Dynamic Random Access Memory).

While the memory 22 is used as a working area of the processor 21, the BIOS (Basic Input/Output System) executed at the starting of the server 20, various setting information, and the like are stored.

The storage 23 stores information and the like used for programs and various processing. The configuration of the storage 23 will be described later.

The transmission/reception unit 24 connects the server 20 to a network 200. The transmission/reception unit 24 may be provided with a short-range communication interface such as Bluetooth (registered trademark) or BLE (Bluetooth Low Energy).

The input/output unit 25 is an interface to which an input/output device such as a keyboard, a mouse, or a display is connected.

The bus 26 transmits, for example, an address signal, a data signal, and various control signals between the connected processor 21, memory 22, storage 23, transmission/reception unit 24, and input/output unit 25.

Figure 3:
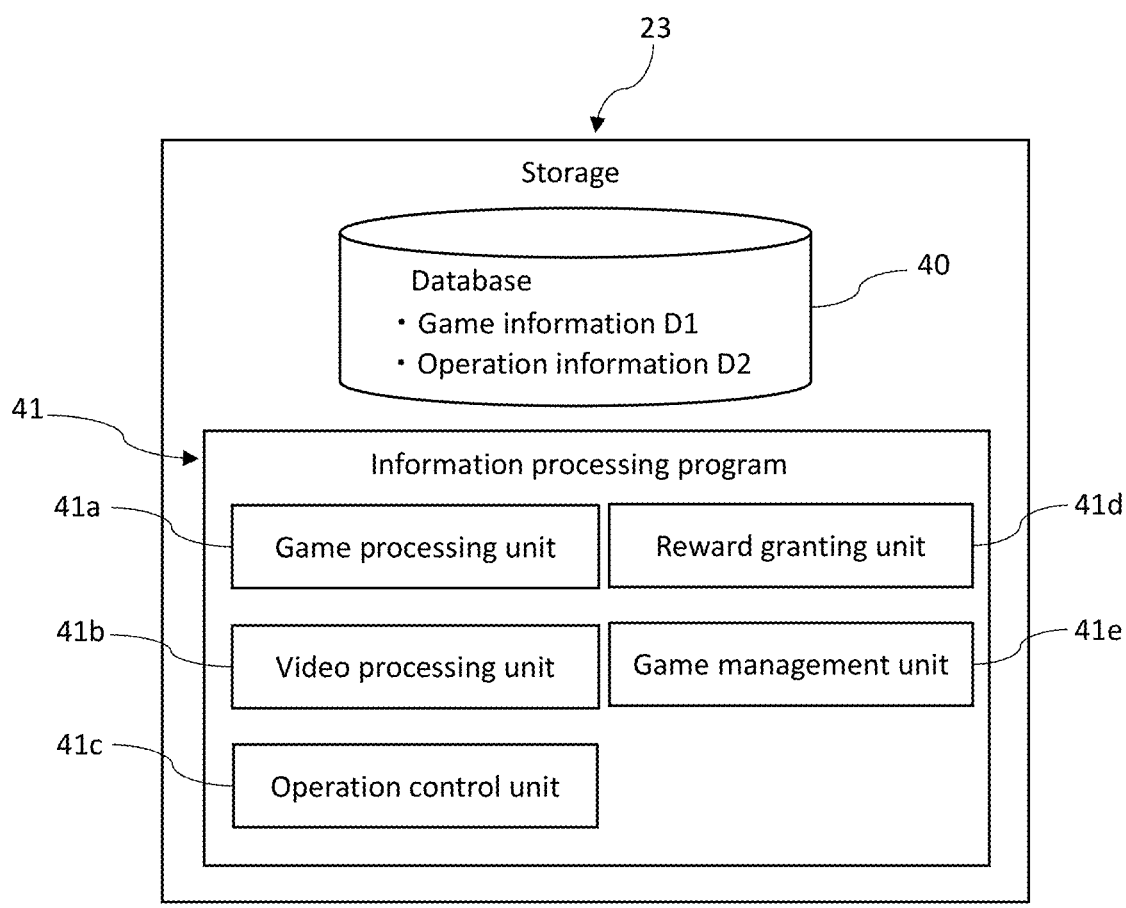
FIG. 3 is a block diagram illustrating an outline of a storage configuration of a server of a game system according to the present embodiment as well.

FIG. 3 is a block diagram illustrating an outline of a configuration of a storage 23. As shown in the figure, the storage 23 includes a database 40 and an information processing program 41 which is a program in the present embodiment.

The database 40 is implemented as a storage area provided by the storage 23, and in the present embodiment, a game information D1 and an operation information D2 are stored.

Figure 4:
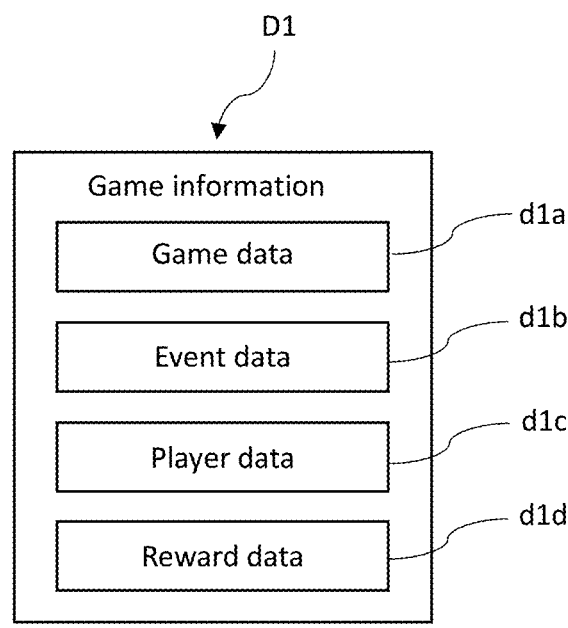
FIG. 4 is a block diagram illustrating an outline of a configuration of game information processed by the game system according to the present embodiment as well.

FIG. 4 is a block diagram illustrating an outline of a configuration of the game information D1. As shown in the figure, the game information D1 includes a game data d1a, an event data d1b, a player data d1c, and a reward data d1d.

In the present embodiment, the game data d1a is configured of data related to the setting of a game according to the type of game, such as a character or an item, a background screen, or the like which appears in a game and background screens. For example, in the case of a fighting game, the stage name and the like associated with a stage ID are included.

In the present embodiment, the character constituting the game data d1a includes a player who acts in a game by operation of a user 2 via a user terminal 30, a character which is a fellow of the player, or an enemy character who plays a match with the player, and the like.

In the present embodiment, the event data d1b is configured of an arbitrary event to which a trial (e.g., fighting with an enemy character) executed by the user 2 as a player is set.

When this type of event is cleared, in-game rewards described later, such as items used in the game or recovery (increase) of various parameters of the player may be given as a bonus.

In the present embodiment, the player data d1c is configured of a player name, data related to a character owned by the user 2 as a player, data related to a character owned by the user 2 as a player and capable of instructing actions, data related to a play stage, and the like.

In the present embodiment, the data related to the owned character is the attribute data related to the attribute of the character, and for example, includes the values of various parameters such as the level, attack power, defense power, hit point (HP), and expertise (Ex) associated with the character's ID. The hit point (HP) is, for example, maximum at the starting of each game, and is a parameter that decreases when attacked by an enemy character or when starting a predetermined attack of the own character, or the like. Then, for example, in a fighting game, when the hit point (HP) becomes 0, it becomes impossible to fight and a predetermined unit of the game (for example, one round of a fighting game (one match)) ends. The expertise (Ex) is a parameter that decreases, for example, when staring a predetermined attack of the own character. Even if it becomes 0, the game is not disabled, and the predetermined unit of the game does not end with just that. In addition, the hit point value and the expertise value may be recovered or increased by satisfying predetermined conditions, respectively.

In the present embodiment, when the player executes an attack based on an attack card described later, various parameters fluctuate, such that the hit point and expertise decrease according to the hit point value and expertise values of the player consumed by the attack, which are set in advance according to the content of the attack.

The data related to the in-game item owned includes, for example, a value such as the number of possessed items associated with the item ID. Further, in-game items and characters can be obtained through a lottery system such as a so-called Gacha, or by a purchase operation of spending in-game points, or by being given as a reward in the process of playing the game, and it is stored in the database 40 in association with user information such as a user ID.

The data related to the play stage is the data related to the stage that the user 2 has played as a player among a plurality of set stages, and for example, includes the number of plays or the data when the stage is cleared.

The reward data did is data related to the in-game reward given to the player.

In the present embodiment, these in-game rewards include: in-game points to be consumed when exchanging to items in the game; recovering various parameters of the player, increasing the upper limit, etc.; execution of any event in the game; increase in the drop rate, which indicates the probability of the player acquiring any item; if a function to be performed is restricted, the restriction can be lifted and the function can be performed; and the like.

Figure 5:
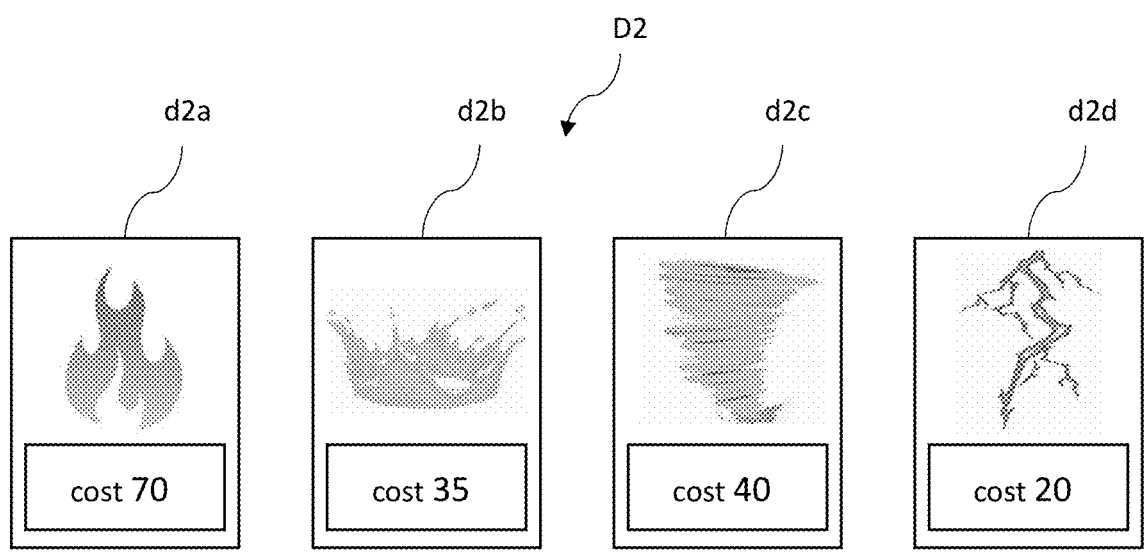
FIG. 5 is illustrating an outline of a configuration of operation information processed by the game system according to the present embodiment as well.

FIG. 5 is illustrating an outline of a configuration of operation information D2. In the operation information D2 of the present embodiment, the player's expertise value to be consumed by the attack and the execution of the attack, which are the operations of the player in the game, is set in advance. As shown in the figure, the attack cards d2a to d2d, which are virtual card-shaped icons, are displayed on the user terminal 30.

In the present embodiment, for the attack cards d2a to d2d, for example, in the attack card d2a, "flame throwing" is set as an attack, and "cost", which is the expertise value of the player consumed by "flame-throwing", is set as "70". Further, the "cost" consumed during an attack such as "flame-throwing" is not limited to the expertise value. For example, it may be a hit point value or the like. Furthermore, both the hit point value and the expertise value may be consumed at the time of an attack such as "flame-throwing", and they may not be consumed anything during the attack (i.e., there is no concept of "cost").

In the present embodiment, in the attack card d2b, for example, "water stream jetting" is set as an attack, and "cost" consumed by the player due to "water stream jetting" is set as "35".

In the present embodiment, in the attack card d2c, for example, "tornado generation" is set as an attack, and "cost" consumed by the player due to "tornado generation" is set as "40".

Similarly, in the present embodiment, the attack card d2d is set to, for example, "thunder generation" as an attack, and the "cost" consumed by the player due to the "thunder generation" is set as "20".

In the present embodiment, the information processing program 41 shown in FIG. 3 includes a game processing unit 41a, a video processing unit 41b, an operation control unit 41c, a reward granting unit 41d, and a game management unit 41e.

In the present embodiment, the game processing unit 41a is a module that executes basic game processing such as a progress of the game and a control of the character. In the present embodiment, the game processing unit 41a executes, for example, character training processing, event processing, function restriction processing, and the like.

In the present embodiment, the character growing processing is a processing in which the values of character's experience, attack power, defense power, hit point, expertise, etc. are improved, for example, by making the character selected by a user 2 as a player running or swimming, thereby executing the character growth.

In the present embodiment, the event processing is a processing that executes an event according to the action of the character selected by the user 2 as a player, and the function limiting processing is a processing that limits the function executed in the game and releases the restriction.

The game processing unit 41a also executes various other basic processing of the game.

The video processing unit 41b is a module that processes video related to a game. In the present embodiment, the operation information D2, which are the attack cards d2a to d2d, is displayed on the user terminal 30 at an arbitrary timing according to the progress of the game after the game is started.

Figure 6:
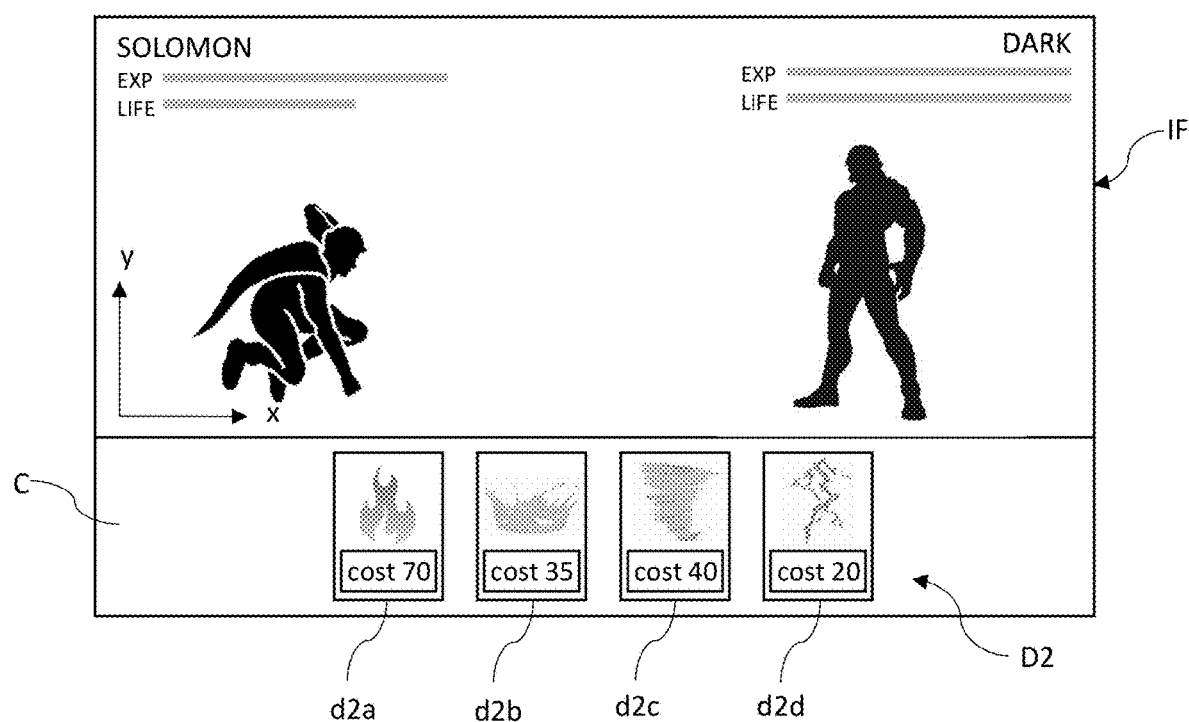
FIG. 6 is illustrating an outline when an information processing program of a game system according to the present embodiment displays operation information on a user terminal as well.

FIG. 6 is illustrating an outline when the video processing unit 41b displays the attack cards d2a to d2d on the user terminal 30. As shown in the figure, the video processing unit 41b displays the attack cards d2a to d2d on the card display area C in the game screen IF in which the coordinate plane consisting of the x-axis and the y-axis is set and displayed on the user terminal 30.

In the present embodiment, the operation control unit 41c shown in FIG. 3 is a module that moves the player in the coordinate plane of the game based on the attack cards d2a to d2d, and at the same time, allows the player to execute an attack on the coordinate plane of the game based on the attack cards d2a to d2d.

Further, the operation control unit 41c is a module that allows the player to execute a continuous attack over a certain period of time (for example, 7 seconds) as a combination bonus (combo), when the attack cards d2a to d2d are arranged at arbitrary coordinate positions in the coordinate plane of the game by the user 2 according to preset conditions.

In the present embodiment, for example, when the user 2 repeats the operation of selecting the same card from the attack cards d2a to d2d and arranging it at an arbitrary coordinate position in the coordinate plane of the game multiple times (for example, three times), that is pre-set as a condition for executing the combo. A time limit may be set as a condition for executing the combo. For example, within a predetermined time limit from the time when the first attack card is selected and arranged at an arbitrary coordinate position in the coordinate plane of the game, the same operation (one of the attack cards is selected and arranged at an arbitrary coordinate position in the coordinate plane of the game) may be repeated multiple times to be executed as a combo. Further, the continuous operation over a certain period of time may include the movement of the player to a plurality of different coordinate positions. That is, the coordinate positions where the cards are arranged to perform the combo may be different coordinate positions, and in that case, it moves to the position where each card is arranged and operates according to each card. Further, the types of cards constituting the combo may be the same or different cards.

Figure 7:
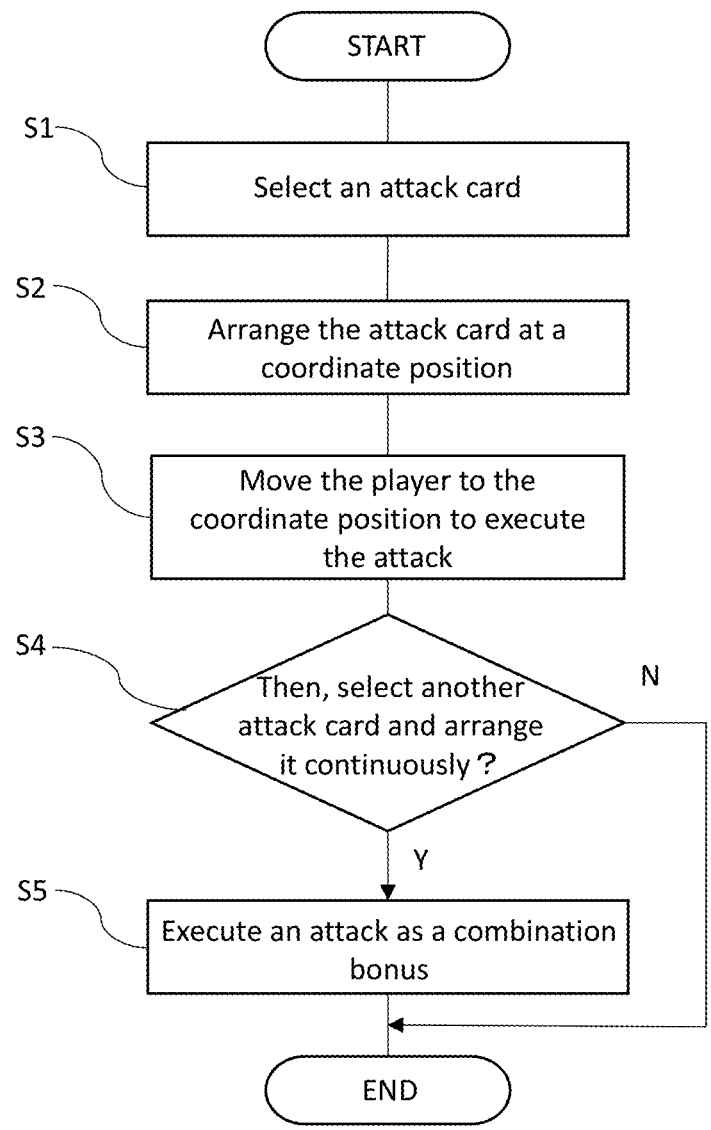
FIG. 7 is a flowchart illustrating an outline of processing of an operation control unit of an information processing program of a game system according to the present embodiment as well.
Figure 8:
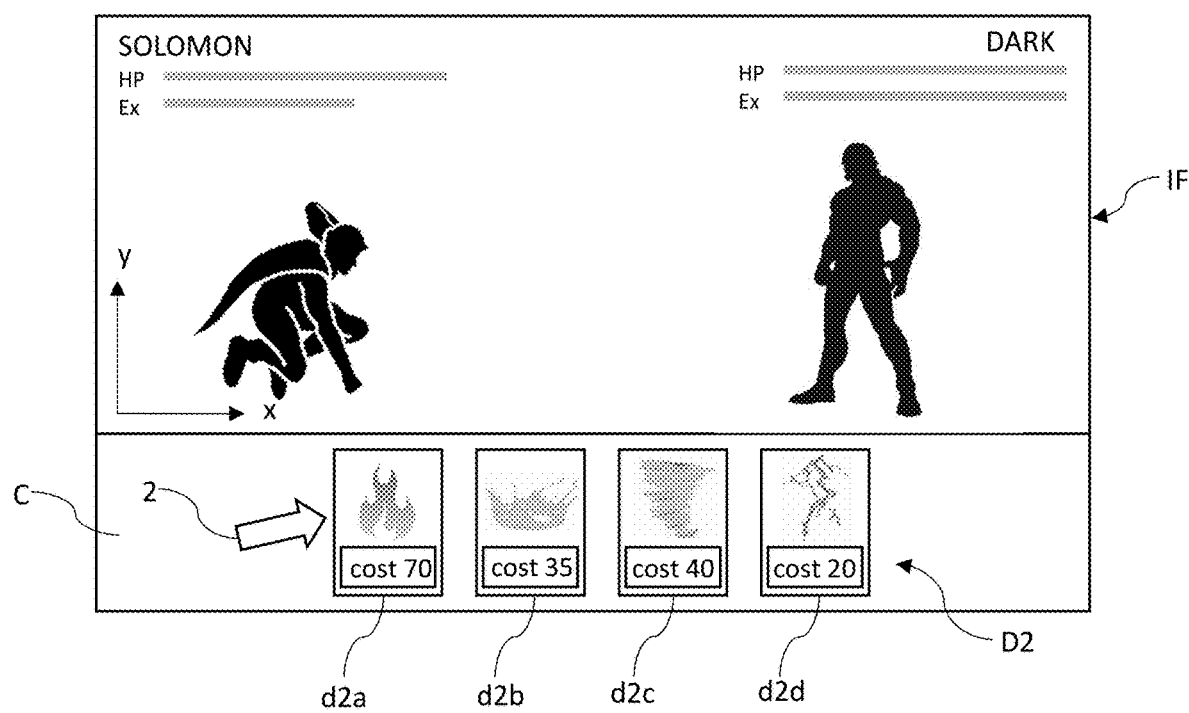
FIG. 8 is a diagram illustrating an outline of processing of an operation control unit of an information processing program of the game system according to the present embodiment as well.
Figure 9:
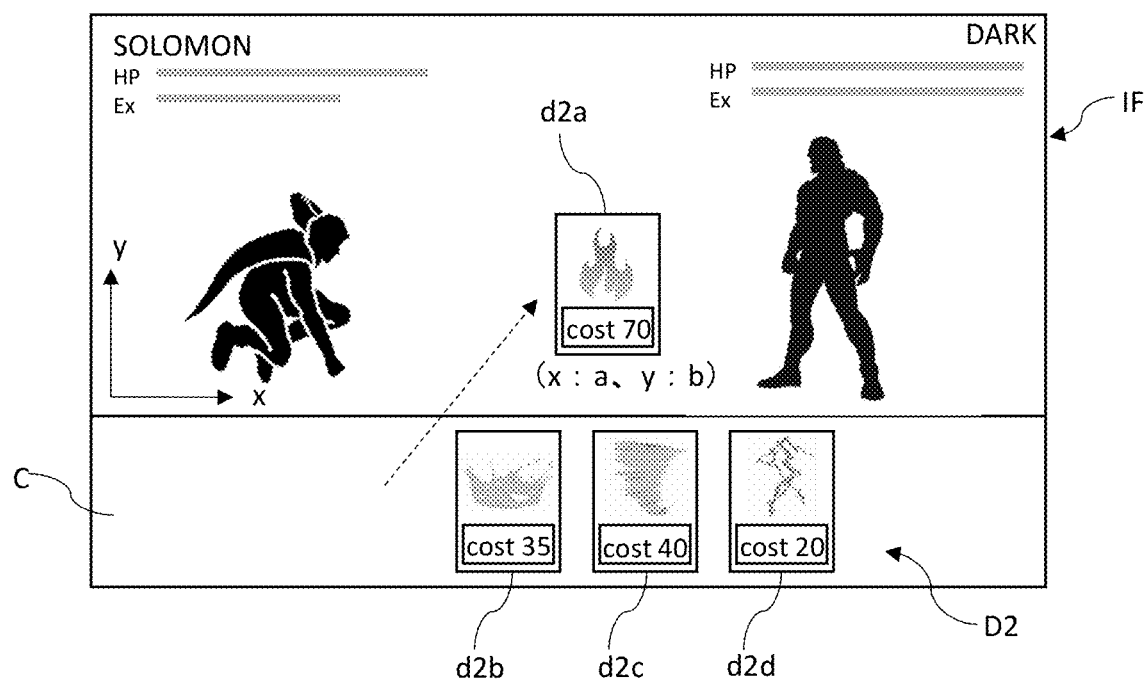
FIG. 9 is a diagram illustrating an outline of processing of an operation control unit of an information processing program of the game system according to the present embodiment as well.
Figure 10:
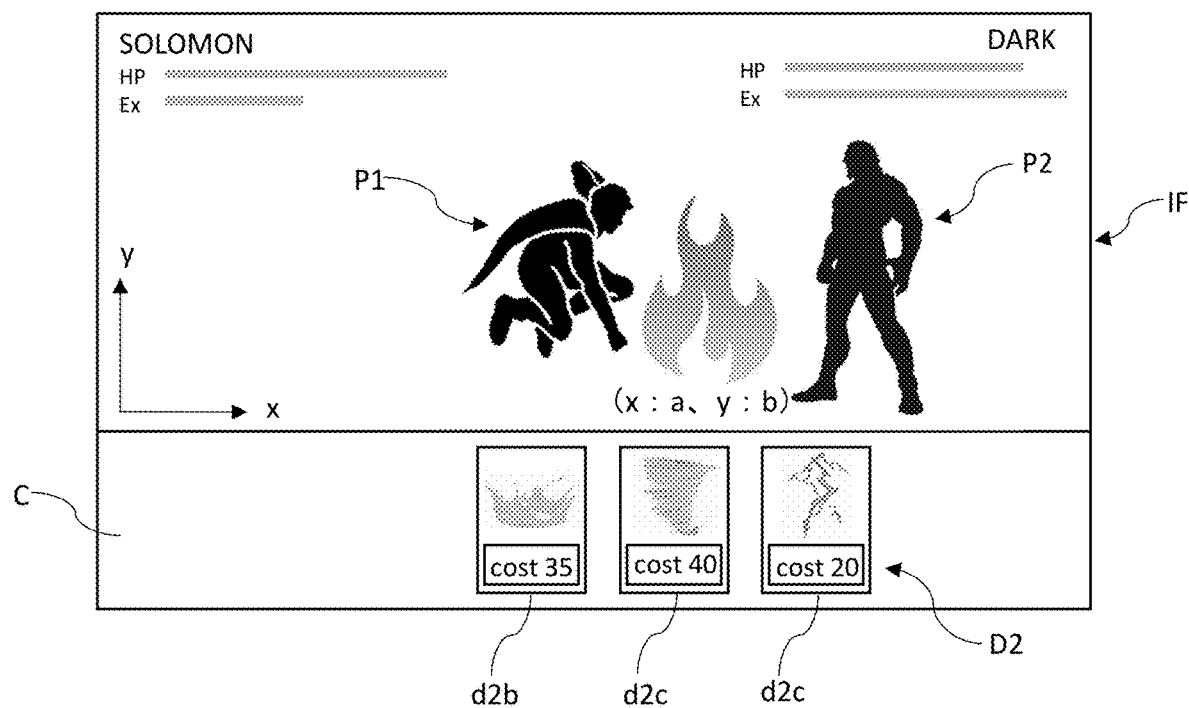
FIG. 10 is a diagram illustrating an outline of processing of an operation control unit of an information processing program of a game system according to the present embodiment as well.

FIG. 7 is a flowchart illustrating the outline of the processing of the operation control unit 41c. FIGS. 8 to 10 are illustrating the outline of the processing of the operation control unit 41c.

As shown in FIG. 7, in step S1, the user 2 selects arbitrary attack cards d2a to d2d via the user terminal 30. In the present embodiment, for example, as shown in FIG. 8, the user 2 selects the attack card d2a on the game screen IF.

Then, in step S2 shown in FIG. 7, the user 2 arranges the selected attack card d2a at an arbitrary coordinate position in the coordinate plane of the game. In the present embodiment, for example, as shown in FIG. 9, the user 2 arranges the attack card d2a at the coordinate position (x:a, y:b) on the game screen IF.

When the user 2 arranges the attack card d2a at the coordinate position, in step S3 shown in FIG. 7, the operation control unit 41c moves the player used by the user 2 to the coordinate position (x:a, y:b) and executes an attack against another player. The other player may be a character instructed by another user 2 to perform an operation, and may be a character controlled by a computer.

In the present embodiment, for example, as shown in FIG. 10, the operation control unit 41c moves the player P1 used by the user 2 to the coordinate position (x:a, y:b) and at the same time, executes "flame-throwing" against the other player P2, which is an attack set on the attack card d2a, at the coordinate positions (x:a, y:b). When the player P2 is attacked, the HP decreases. The amount of decrease in the HP of the player P2 at that time is determined, for example, according to the type of attack card, the attack power of the player P1, the defense power of the player P2, or whether or not the player P2 is guarding (defending).

Then, in step S4 shown in FIG. 7, when the operation in which the user 2 selects the attack card d2a and arranges it at the coordinate position (x:a, y:b) of the game is repeated, for example, over three times, the operation control unit 41c makes the player of the user 2 execute a continuous attack over a certain period of time as a combo in step S5. In this way, when the operation of executing a continuous attack (combo) is successful, a predetermined performance may be executed, or the performance may be changed. For example, the effect of the attack (attack power) may become larger, or the performance may become different from the normal performance (the performance becomes more flashy), or the reward obtained after the victory may become larger than usual.

In the present embodiment, the reward granting unit 41d shown in FIG. 3 is a module for granting an in-game reward to a player used by the user 2 in the game.

It is assumed that the reward granting by the reward granting unit 41d grants the player an in-game reward as a bonus when the player used by the user 2 in the game clears an arbitrary event that occurs in the game, or grants the player an in-game reward as a login bonus when the user 2 logs in to the game, for example, The game management unit 41e is a module that processes attribute data related to the attributes of the player character included in the player data d1c based on the operation information D2.

In the present embodiment, this game management department 41e, when the player executes an attack with attack cards d2a-d2d, processes the parameter of the expertise value of the player, which is the attribute data, according to "cost", which is a value pre-set in the attack cards d2a to d2d.

For example, as shown in FIG. 10, when the player P1 executes "flame-throwing" with the attack card d2a, the "Ex" that displays the parameter of the expertise value of the player P1 decreases according to the "cost" of "70" set on the attack card d2a.

The game management unit 41e also executes various basic game management (for example, login management).

In the present embodiment, the game is executed on the user terminal 30, based on the processing in the information processing program 41 including the game processing unit 41a, the video processing unit 41b, the operation control unit 41c, the reward granting unit 41d, and the game management unit 41e.

In the present embodiment, the user terminal 30 shown in FIG. 1 is implemented on a smartphone, which is a portable information terminal, but for example, it may be implemented by a game dedicated terminal, a tablet computer, a desktop computer, or a notebook computer.

Figure 11:
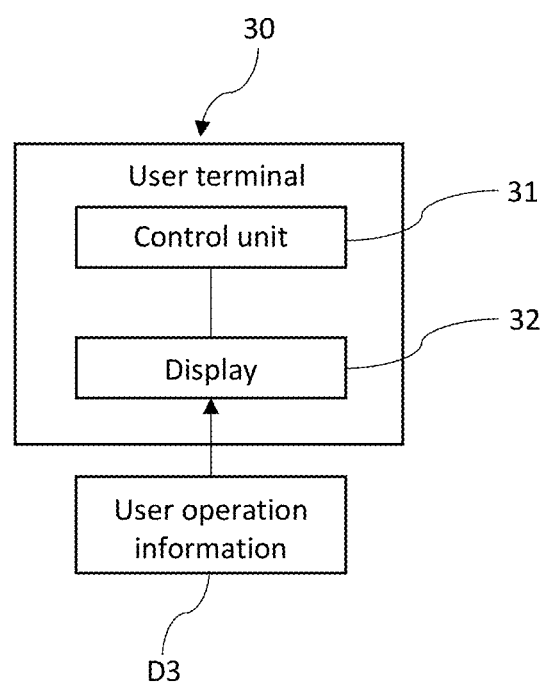
FIG. 11 is a block diagram illustrating an outline of a configuration of a user terminal of the game system according to the present embodiment as well.

FIG. 11 is a block diagram illustrating an outline of a configuration of the user terminal 30. As shown in the figure, the user terminal 30 includes a control unit 31 and a display 32 as main configurations.

In the present embodiment, the control unit 31 controls each unit of the user terminal 30 such as a display 32 and a camera (not shown), and includes, for example, a processor, a memory, a storage, a transmission/reception unit, and the like.

In the present embodiment, a browser capable of browsing a game application or a website is stored in the control unit 31, and based on the processing in the information processing program 41 of the server 20, the game is executed on the user terminal 30 via the game application or the browser.

In the present embodiment, the display 32 displays a screen interface of the game executed on the user terminal 30, including the game screen IFs shown in FIGS. 6 and 8 to 10.

The display 32 is a so-called touch panel that receives input of information by contact with a display surface, and is implemented by various techniques such as a resistive film method and a capacitance method.

In the present embodiment, the user operation information D3 is input via the display 32.

In the present embodiment, the user operation information D3 is information input regarding the operation or action of the player, and is information based on an arbitrary operation of the user 2 (for example, an operation of tapping or swiping the screen, an operation of dragging and dropping an icon and the like displayed on the screen, etc.) with respect to the display 32.

Next, the outline of the processing of the game system 10 according to the present embodiment will be described.

In a fighting type action game, in case where a player used by the user 2 in the game fights with another player in real time, when the player of the user 2 executes an attack against another player, an arbitrary attack card is selected from the attack cards d2a to d2d displayed in the card display area C of the game screen IF displayed on the display 32 of the user terminal 30.

In the present embodiment, the user 2 selects the attack card d2a by tapping the attack card d2a in which, for example, "flame-throwing" is set, through the display 32 as the user operation information D3 (in this case, while touching the display 32 with a finger or the like at the position of the attack card d2a).

Then, as the user operation information D3, the user 2 drags the attack card d2a selected via the display 32 (slides it while touching the display 32 with a finger, etc.), and then drops the attack card at an arbitrary coordinate position (e.g., (x:a, y:b)) on the coordinate plane of the game screen IF (releases a finger or the like on the display 32), thereby arranging the attack card d2a at the coordinate position (x:a, y:b). Further, the operation method when arranging attack cards is not limited to so-called drag-and-drop. It is sufficient if the user 2 can, at least, input the selection of the card to be placed and the coordinate position to be placed by a predetermined operation. For example, the attack card d2a is selected by tapping the attack card d2a via the display 32, and then the attack card d2a may be arranged at that coordinate position, (x:a, y:b), by tapping an arbitrary coordinate position (e.g. (x:a, y:b)) on the coordinate plane of the game screen IF.

As a result, the player of the user 2 moves to the coordinate position (x:a, y:b) of the game screen IF, and execute "flame throwing" to the other player at this coordinate position (x:a, y:b).

In the present embodiment, when the player executes "flame-throwing" with the attack card d2a, the player's "Ex" decreases according to the "cost" set on the attack card d2a. Further, the player's "HP" may be reduced according to the "cost" set on the attack card d2a.

In this manner, it is possible to move a player to a desired coordinate position in the game and execute the attack at that coordinate position, by a simple operation in which the user 2 selects the attack cards d2a to d2d and arranges the attack cards d2a to d2d at arbitrary coordinate positions in the game.

Moreover, in the present embodiment, a plurality of attack cards d2a to d2d in which different attacks are preset are prepared, and the user 2 can select a desired attack card from a plurality of attack cards d2a to d2d, thereby improving the user's interest in the game.

However, in the present embodiment, as the user operation information D3, when the operation, in which the user 2 selects the attack card d2a via the display 32, drags it to the coordinate position (x:a, y:b) of the game, and drops it, is repeated multiple times (three times for example), the player of the user 2 executes the continuous "flame-throwing" over a certain period of time as a combo.

Meanwhile, when the player used by the user 2 performs a basic operation such as defending with an arm, dodging the body, or jumping against an attack from another player, the user operation information D3 can be executed by a basic operation such as long-pressing or flicking or the like via the display 32.

The present invention is not limited to the above-mentioned embodiments, and various modifications can be made without departing from the spirit of the invention.

In the above embodiment, the case where the game provided by the business operator 1 is a fighting type action game in which the player used in the game by the user 2 fights with another player in real time has been described, but it may be a turn-type game in which attack and defense alternate in turns. In this case, it may be not only a fighting type game but also a sports game in which offense and defense change depending on the actions of the defensive side such as American football and baseball.

Further, in the present embodiment, the format is not limited to the so-called PvP (player vs. player) format and may be a PvE (player vs. environment (enemy controlled by a computer, etc.)) format.

In the above embodiment, the case where "flame-throwing", "water stream jetting", "tornado generation", and "thunder generation" are respectively set as attacks on the attack cards d2a to d2d has been described, but the present invention is not limited thereto, and any other actions such as attack and defense may be appropriately set according to the type of the game.

Further, the server 20 may further include an operation information changing unit. The operation information changing unit can change the operation in the operation information based on an instruction for associating the operation information by the user with another operation information or a game medium. Associating other operation information with the operation information is, for example, synthesizing (combining) the attack card d2a and the attack card d2d. Further, associating the game medium with the operation information means, for example, synthesizing a game medium such as an item with the attack card d2a. Therefore, for example, the attack card is changed to a new attack card (generate attack cards) that allows a combined attack of flame and lightning, which is a combination of "flame-throwing" as an action on the attack card d2a and "thunder generation" as an action on the attack card d2d (generate attack cards), and the attack card d2a is combined with a strengthening item that increases the effect of the attack, thereby increasing the effect of the attack card d2a. Further, the image of the card-shaped icon may be changed when the operation in the operation information is changed. By operating the user terminal, the user can give an instruction for associating other operation information or a game medium with the operation information. The operation information changing unit of the server 20 can change, for example, the type and effect of the operation ("flame-throwing", etc.) of the attack card d2a based on the instruction. The user can use the combined attack card in the same way as other attack cards. Further, the operation information changing unit may be able to store information related to such a change in operation information in the database 40 in association with user information such as a user ID and/or the like. In addition, by associating each operation information with other operation information or a game medium, information on how the operation of the operation information changes is stored in the database in advance, the operation information changing unit can perform the change processing of the operation by referring to the information.

The present invention has the following configurations.

[Item 1]

A game system that provides a game that can be executed on a user terminal capable of accessing a server via a network, the game system comprising:

a database in which an operation of a player in the game that a user uses in the game via the user terminal is preset and the operation information displayed as an icon on the user terminal is stored; and an operation control unit that makes the player execute the operation at a coordinate position based on the operation information while moving the player to the coordinate position based on the operation information when the operation information stored in the database is selected by the user and arranged at an arbitrary coordinate position in the game.

[Item 2]

The game system as set forth in Item 1, wherein the operation information is displayed on the user terminal as a virtual card-shaped icon.

[Item 3]

The game system as set forth in Item 1 or 2, wherein the operation control unit makes the player continuously execute the operation over a certain period of time when the operation information is arranged at any of the coordinate positions in the game under preset conditions.

[Item 4]

The game system as set forth in Item 3, wherein the continuous operation over a certain period of time comprises movements of the player to a plurality of different coordinate positions.

[Item 5]

The game system as set forth in any one of Items 1 to 4, which comprises a game management unit that processes attribute data related to the attributes of the player based on the execution of the player's operation based on the operation information.

[Item 6]

The game system as set forth in any one of Items 1 to 5, wherein the game is a fighting type game in which the player fights with another player.

[Item 7]

The game system as set forth in any one of Items 1 to 6, which further comprises an operation information changing unit in which the user changes the operation in the operation information based on an instruction for associating the operation information with another operation information or a game medium.

[Item 8]

A program for executing a game on a user terminal capable of accessing a server via a network, the program comprising:

making a player execute the operation at the coordinate position based on the operation information: and moving the player to the coordinate position based on the operation information, by an operation control unit when an operation of a player in the game that a user uses in the game via the user terminal is preset and operation information displayed as an icon on the user terminal is selected by the user and arranged at an arbitrary coordinate position in the game.

[Item 9]

An information processing method for executing a game on a user terminal capable of accessing a server via a network, the method comprising:

making a player execute the operation at the coordinate position based on the operation information; and moving the player to the coordinate position based on the operation information, by an operation control unit when an operation of a player in the game that a user uses in the game via the user terminal is preset and operation information displayed as an icon on the user terminal is selected by the user and arranged at an arbitrary coordinate position in the game.

DESCRIPTION OF REFERENCE NUMERALS

1: business operator
2: user
10: game system
20: server
30: user terminal
40: database
41: information processing program (program)
41c: operation control unit
41e: game management department
D2: operation information
d2a-d2d: attack cards

The invention claimed is:

1. A game system that provides a game that can be executed on a user terminal capable of accessing a server via a network, the game system comprising:

a database in which an operation of a player in the game that a user uses in the game via the user terminal is preset and operation information displayed as an icon on the user terminal is stored; and an operation control unit that makes the player execute the operation at an arbitrary coordinate position, based on the operation information while moving the player to the arbitrary coordinate position based on the operation information, when the operation information stored in the database is selected by the user and arranged at the arbitrary coordinate position in the game, wherein the game is a game in which the player, who is a single operation target, plays a match with an enemy character.

2. The game system according to claim 1, wherein the operation information is displayed on the user terminal as a virtual card-shaped icon.

3. The game system according to claim 1, wherein the operation control unit makes the player continuously execute the operation over a certain period of time when the operation information is arranged at any of coordinate positions in the game according to preset conditions.

4. The game system according to claim 3, wherein the continuous operation over the certain period of time comprises movements of the player to a plurality of different coordinate positions.

5. The game system according to claim 1, which further comprises a game management unit that processes attribute data related to attributes of the player based on the execution of the player's operation based on the operation information.

6. The game system according to claim 1, wherein the game is a fighting type game in which the player fights with another player.

7. The game system according to claim 1, which further comprises an operation information changing unit in which the user changes the operation in the operation information based on an instruction for associating the operation information with another operation information or a game medium.

8. A non-transitory computer readable medium having stored thereon a computer executable instruction(s) to execute a game on a user terminal capable of accessing a server via a network, the game comprising:
- when an operation of a player in the game that a user uses in the game via the user terminal is preset and operation information displayed as an icon on the user terminal is selected by the user and arranged at an arbitrary coordinate position in the game,
- making the player execute the operation at the arbitrary coordinate position based on the operation information; and
- moving the player to the arbitrary coordinate position based on the operation information,
- wherein the game is a game in which the player, who is a single operation target, plays a match with an enemy character.

9. An information processing method for executing a game on a user terminal capable of accessing a server via a network, the method comprising:
- when an operation of a player in the game that a user uses in the game via the user terminal is preset and operation information displayed as an icon on the user terminal is selected by the user and arranged at an arbitrary coordinate position in the game,
- making the player execute the operation at the arbitrary coordinate position based on the operation information; and
- moving the player to the arbitrary coordinate position based on the operation information,
- wherein the game is a game in which the player, who is a single operation target, plays a match with an enemy character.

10. The non-transitory computer readable medium according to claim 8,
- wherein the operation control unit makes the player continuously execute the operation over a certain period of time when the operation information is arranged at any of coordinate positions in the game according to preset conditions.

11. The non-transitory computer readable medium according to claim 10,
- wherein the continuous operation over the certain period of time comprises movements of the player to a plurality of different coordinate positions.

12. The information processing method according to claim 9,
- wherein the operation control unit makes the player continuously execute the operation over a certain period of time when the operation information is arranged at any of coordinate positions in the game according to preset conditions.

13. The information processing method according to claim 12,
- wherein the continuous operation over the certain period of time comprises movements of the player to a plurality of different coordinate positions.

* * * * *